United States Patent [19]

Colgren et al.

[11] Patent Number: 5,063,735
[45] Date of Patent: Nov. 12, 1991

[54] ROCKET-POWERED DUCTED FAN ENGINE

[76] Inventors: Richard D. Colgren, 2923 E. Avenue R-11; Christopher C. Criss, 2929 E. Avenue R-11; Russell J. Criss, 37671 Lasker Ave., all of, Palmdale, Calif. 93550

[21] Appl. No.: 599,722
[22] Filed: Oct. 18, 1990
[51] Int. Cl.$^5$ ............................................. F02K 5/00
[52] U.S. Cl. ........................................ 60/246; 60/253
[58] Field of Search ................... 60/246, 253, 39.142; 446/211, 56; 102/374; 272/31 A

[56] References Cited

U.S. PATENT DOCUMENTS

| 2,457,833 | 1/1949 | Redding | 60/39.142 |
| 3,750,394 | 8/1973 | Larsen et al. | 60/39.142 |
| 3,985,104 | 5/1961 | Fox | 60/39.142 |

Primary Examiner—Louis J. Casaregola
Assistant Examiner—Howard R. Richman
Attorney, Agent, or Firm—Louis L. Dachs

[57] ABSTRACT

The invention is a propulsion system. In detail, the invention comprises a hollow housing having a longitudinal axis and an inlet end and an exhaust nozzle end. A shaft is rotatively mounted along the longitudinal axis within the housing, extending from the inlet end to the exhaust nozzle end. A fan is attached to one end of the shaft in proximity to the inlet end of the housing. A turbine, having a plurality of blades, is attached to the opposite end of the shaft in proximity to the exhaust nozzle end of the housing. A solid propellant rocket motor is detachably mounted to the housing, having a thrust axis alignable with the longitudinal axis of the housing such that, when the motor is ignited, at least a portion of any exhaust gases therefrom are intercepted by the blades of the turbine for driving same.

5 Claims, 1 Drawing Sheet

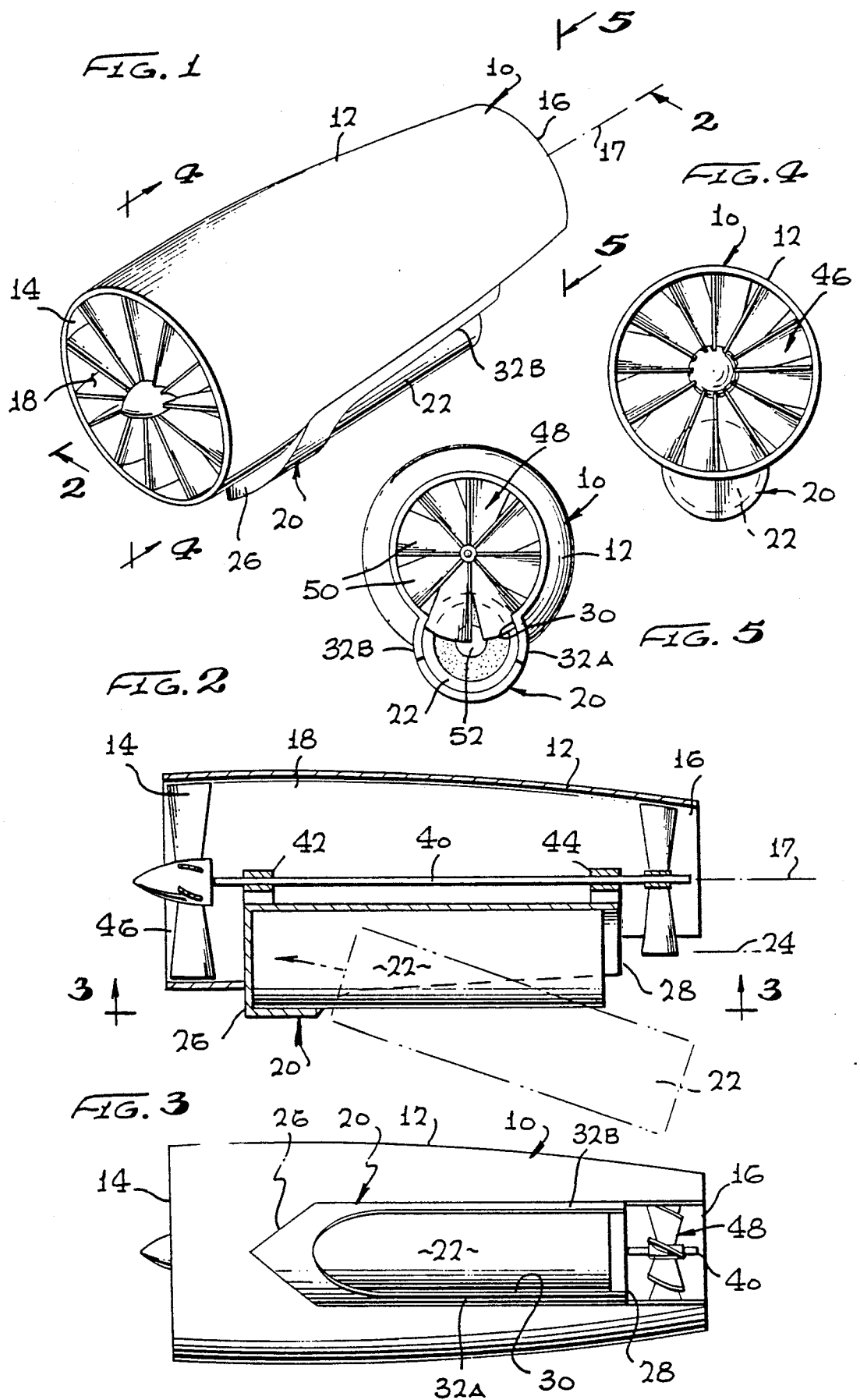

ROCKET-POWERED DUCTED FAN ENGINE

BACKGROUND OF THE INVENTION

1. Field of the Invention

The invention relates to the field of ducted fan propulsion systems and, in particular, to a ducted fan propulsion system for toy vehicles and the like.

2. Description of Related Art

In any propulsion system that uses combustion exhaust thrust to produce directly forward velocity, maximum efficiency is achieved when the forward velocity of the vehicle equals the velocity of the exhaust. This is why a helicopter is more efficient when hovering than a vertical, takeoff-and-landing aircraft such as the AV-8A Harrier aircraft and a propeller driven aircraft more efficient than a jet powered aircraft at low speed. The same principle applies for toy vehicles.

However, no rocket powered toy car or aircraft is ever going to be operating at speeds where any degree of propulsive efficiency will be achieved. Yet, toy solid propellant rocket engines come in many convenient sizes and "pack" a lot of energy into a very small, lightweight and inexpensive package. Thus, they are very attractive for use in toy dragsters and the like. They are much lighter in weight than the commonly used high pressure, carbon dioxide cartridges, which only come in one basic size. Using a conventional two-cycle, internal combustion engine to power a ducted fan would create an expensive, heavy and complicated propulsion system. Thus, a propulsion system that combines the high energy source of a solid propellant rocket motor with the low speed efficiency of a fan would provide the best of two worlds, at least as a toy vehicle power plant.

The only known significant prior art that combines solid propellants with a jet engine is the use of a solid propellant gas generator to start the engine. In this application the combustion products are ducted to and drive the turbine blades. The turbine drives the compressor up to a speed sufficient to produce enough pressure in the combustion section such that the engine becomes operational on its own. However, propulsive forces are not generated.

Thus, it is a primary object of the subject invention to provide a solid propellant rocket motor powered ducted fan engine.

It is another primary object of the subject invention to provide a solid propellant rocket motor powered ducted fan engine wherein the rocket motor also provides a significant portion of the total thrust.

It is a further object of the subject invention to provide a propulsion system for toy vehicles and the like.

SUMMARY OF THE INVENTION

The invention is a propulsion system. In detail, the invention comprises a hollow, circular-shaped housing having a longitudinal axis and an inlet end and an exhaust nozzle end. A shaft is rotatively mounted along the longitudinal axis within the housing extending from the inlet end to the exhaust nozzle end. A fan is attached to one end of the shaft in proximity to the inlet end of the housing. A turbine, having a plurality of blades, is attached to the opposite end of the shaft in proximity to the exhaust nozzle end of the housing. A solid propellant rocket motor is detachably mounted to the housing between the fan and turbine, offset from, but having a thrust axis (the axis or direction in which the thrust of the motor is produced) parallel with the longitudinal axis of the housing, such that the turbine blades intercept at least a portion of any exhaust gases therefrom. Thus, a portion of the thrust of the solid propellant rocket motor is converted into power to drive the fan. Preferably, the turbine blades should intercept about 50 percent of the exhaust gases from the motor.

In order to achieve proper alignment of the motor thrust axis with the turbine blades, any practical size motor will protrude into the interior of the housing. Thus, a compartment for receiving the motor is formed in the housing wall extending to the exterior and into the interior of the housing. Both the exterior and interior forward wall of this compartment have aerodynamically shaped surfaces to reduce drag. The rear end of the compartment is open, of course, to allow exhaust gases to be expelled and, further, to allow the installation and removal of the motor. The bottom wall of the compartment is also notched from the rear end along most its length forming a slot with edges that act as spring biased clips to hold the motor in place. These features allow the motor to be easily installed with a simultaneous upward and forward push into the compartment releaseably locking the motor therein. Finally, the housing wall is notched from the end of the motor to the nozzle end, exposing those turbine blades that intercept the exhaust gases at any one time, thus providing for more effective exhaust gas flow.

The novel features that are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a perspective view of the subject engine.

Illustrated in FIG. 2 is a cross-sectional view of the engine shown in FIG. 1, taken along the line 2—2.

Illustrated in FIG. 3 is a partial bottom view of the engine shown in FIG. 2, taken along the line 3—3.

Illustrated in FIG. 4 is a front view of the engine shown in FIG. 1 taken along the line 4—4.

Illustrated in FIG. 5 is a rear view of the engine shown in FIG. 1 taken along the line 5—5.

DESCRIPTION OF THE PREFERRED EMBODIMENT

Referring to FIGS. 1-5, it can be seen that the engine, generally indicated by the numeral 10, includes a circular-shaped, hollow housing 12, having an inlet end 14 and an exhaust nozzle end 16, with a longitudinal axis indicated by numeral 17, and the interior of the housing indicated by numeral 18. A generally circular-shaped compartment 20 is mounted to the bottom of the housing 12 for receiving a solid propellant motor 22. The compartment 20 has a longitudinal axis 24 offset, but generally parallel to the longitudinal axis 17, and extends into the interior 18 and to the exterior of the housing. The compartment, further, includes an aerodynamic (low drag) front end 26 and an open rear end 28. A portion of the bottom rear end of the housing 12 is removed, forming a slot 30 that extends forward to the open rear end 28 of the compartment 20. Thus, it is an easy process to install the solid propellant rocket motor 22 by inserting the motor upward and forward into the compartment from the rear of the housing. The side portions 32A and 32B of the compartment wall are thin and bent inward very slightly and, thus, act as spring clips retaining the motor 22 within the compartment.

A drive shaft 40 is rotatively supported within the housing 12 by a front-bearing mount 42 joined to the housing and a rear-bearing mount 44 joined to the top of the compartment 20. Mounted on the front end of the shaft 40 is a fan 46, while mounted on the rear end of the shaft is a turbine 48. The blades 50 of the turbine 48 are designed to extend into the slot 30 such that the blades will extend across at least a portion of the exhaust nozzle 52 of the motor 22 (best seen in FIG. 5). Preferably, the blades extend across fifty (50) percent of the area of the nozzle 52. Thus, the longitudinal axis of the compartment 20 and, thereby, the motor 22 is aligned with the tips of the blades 50. Therefore, the direction of thrust produced by the motor or thrust axis 24 is parallel, but offset from, the longitudinal axis 17 of the housing 12.

The increase in performance obtained by use of the rocket powered ducted fan engine over a rocket engine alone is significant. For example, a commercially available toy solid propellant rocket motor 1.25 inches long with a diameter of 0.50 inch produces about 5.5 ounces of thrust.

However, when used as the power source for a model of the engine 10 having a length of 2.5 inches, an inlet end diameter of 1 inch and a nozzle end diameter of 0.75 inch, the thrust increased to around 11 ounces. Thus, the turbine is apparently absorbing a significant amount of the energy lost due to the limited nozzle expansion ratio provided by the rocket engine. Also, because such "toy" rocket engines normally do not have sonic or choked flow at the nozzle throat, the burning of the propellant upstream of the throat is affected by downstream pressure changes. Thus, the increase in back pressure caused by the turbine blades absorbing energy increases the burn time of the engine. This is an additional desirable feature, since a toy car or aircraft can run longer.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

We claim:

1. A propulsion system comprising:
    a hollow housing having a longitudinal axis and an inlet end and exhaust nozzle end;
    a shaft rotatively mounted along the longitudinal axis within said housing extending from said inlet end to said exhaust nozzle end;
    a thrust producing fan attached to one end of said shaft in proximity to said inlet end of said housing;
    a turbine, having a plurality of blades, attached to the opposite end of said shaft in proximity to the exhaust nozzle end of said housing, said turbine for driving said fan;
    a solid propellant rocket motor detachably mounted to said housing, said motor mounted to said housing with the exhaust nozzle thereof positioned such that when said motor is ignited, the direction of thrust of said motor is parallel with and offset from the longitudinal axis of said housing and at least a portion of any exhaust gases therefrom are intercepted by said blades of and drive said turbine whereby all the exhaust gases exiting said housing provide forward thrust.

2. The propulsion system as set forth in claim 1 wherein said motor is mounted between said fan and said turbine.

3. The propulsion system as set forth in claim 2 wherein said solid rocket motor is positioned within said housing, such that a maximum of 50 percent of the exhaust gases from said exhaust nozzle are intercepted by said turbine blades when said motor is ignited.

4. The propulsion system as set forth in claim 3 comprising:
    a cylindrical compartment for receiving said motor, said compartment having a closed-off front end and an open rear end aligned with said blades of said turbine; and
    said housing having a slot therein extending from said exhaust nozzle end to said compartment.

5. The propulsion system as set forth in claim 4 including said compartment having an external side, said side having a slot extending from said rear end toward said front end over a portion of the length thereof, the width of said slot being just smaller than the diameter of said motor such that the edges of said slot act as spring clips to retain said motor when installed in said compartment.

* * * * *